United States Patent
Wallace, Jr.

[15] 3,680,309
[45] Aug. 1, 1972

[54] TWO-SPOOL AUXILIARY POWER UNIT AND CONTROL MEANS

[72] Inventor: Frank Blakeslee Wallace, Jr., Phoenix, Ariz.

[73] Assignee: The Garrett Corporation, Los Angeles, Calif.

[22] Filed: Sept. 25, 1969

[21] Appl. No.: 861,097

[52] U.S. Cl..............................60/39.07, 60/39.16 R
[51] Int. Cl..................................................F02c 7/02
[58] Field of Search....60/39.16, 39.07, 39.18, 39.23, 60/39.29

[56] References Cited

UNITED STATES PATENTS

| 2,658,334 | 11/1953 | Marchant | 60/39.16 X |
|---|---|---|---|
| 2,978,169 | 4/1961 | Stanton | 60/39.16 |
| 3,108,767 | 10/1963 | Eltis | 60/39.07 X |
| 2,873,576 | 2/1959 | Lombard | 60/39.23 X |
| 3,357,176 | 12/1967 | Williams | 60/39.16 |
| 3,448,582 | 6/1969 | Bracey | 60/39.16 X |
| 3,486,328 | 12/1969 | Boudigues | 60/39.16 UX |
| 3,514,945 | 6/1970 | Austin | 60/39.16 |
| 3,514,948 | 6/1970 | Warne | 60/39.16 X |
| 3,514,952 | 6/1970 | Schumacher | 60/39.16 X |
| 3,526,092 | 9/1970 | Steel | 60/39.16 |

*Primary Examiner*—Douglas Hart
*Attorney*—Herschel C. Omohundro and John N. Hazelwood

[57] ABSTRACT

A gas turbine engine with dual, telescoped, independently acting rotor constructions having a multistage, axial, low-pressure compressor impeller on one rotor and a single-stage, centrifugal, high-pressure impeller on the other rotor. Casing provides separated bleed air and combustion air chambers, the former receiving air from one impeller and the latter receiving high-pressure air from the other. Control means are provided to cause one rotor to operate at constant speed and the other to operate at variable speeds necessary to meet predetermined pneumatic requirements with consequent maximum efficiency in all stages of operation whereby the lowest possible fuel consumption per mission will result.

15 Claims, 5 Drawing Figures

3,680,309

TWO-SPOOL AUXILIARY POWER UNIT AND CONTROL MEANS

SUMMARY

This invention relates generally to gas turbine engines, and is more particularly directed to an engine primarily provided for use as an auxiliary power unit. Such units are employed on aircraft to supply pneumatic power for cabin pressurization and environmental control system use and/or shaft power for the generation of electric current and hydraulic pressure. One of the objects of this invention is to provide a gas turbine engine which has the capability of driving an accessory, such as an alternator, at a substantially constant rate and a pneumatic supply device, i.e., a pump or compressor, at a variable rate to meet changing pneumatic requirements, the engine being further provided with control means which will secure the most efficient engine operation.

Another object of the invention is to provide a gas turbine engine having low- and high-pressure spools which are independently rotatable, and adjustable means responsive to signals from different sources for controlling the operation of the spools whereby one may be made to rotate a a constant rate and the other at a variable rate, depending upon the requirements of means utilizing the power output thereof.

Still another object of the invention is to provide a gas turbine engine having concentrically arranged, low- and high-pressure spools, one having a multistage, axial, compressor impeller and the other a single-stage, centrifugal, compressor impeller, the casing of the engine being divided by a partition into bleed and combustion air chambers, the impeller of the low-pressure spool communicating with the bleed air chamber and the impeller of the high-pressure spool discharging into the combustion air chamber, adjustable control means being provided to vary the speed of the low-pressure spool in accordance with the requirements of means utilizing the bleed air.

A further object of the invention is to provide the gas turbine engine referred to in the preceding paragraph with fuel control means responsive to the rate of operation of the high-pressure spool to cause such spool to operate at a constant speed suitable for driving electric current generating means.

An object also is to provide the engine referred to in the two preceding paragraphs with adjustable guide vanes in the inlet to the turbine of the low-pressure spool to vary the effect of the gases admitted to the turbine to cause it to drive the low-pressure compressor at different rates.

Other objects and the manner of attaining them will be apparent from the following description of an engine and control system therefor selected for illustration in the accompanying drawings.

THE DRAWINGS

DESCRIPTION

Figure 1:
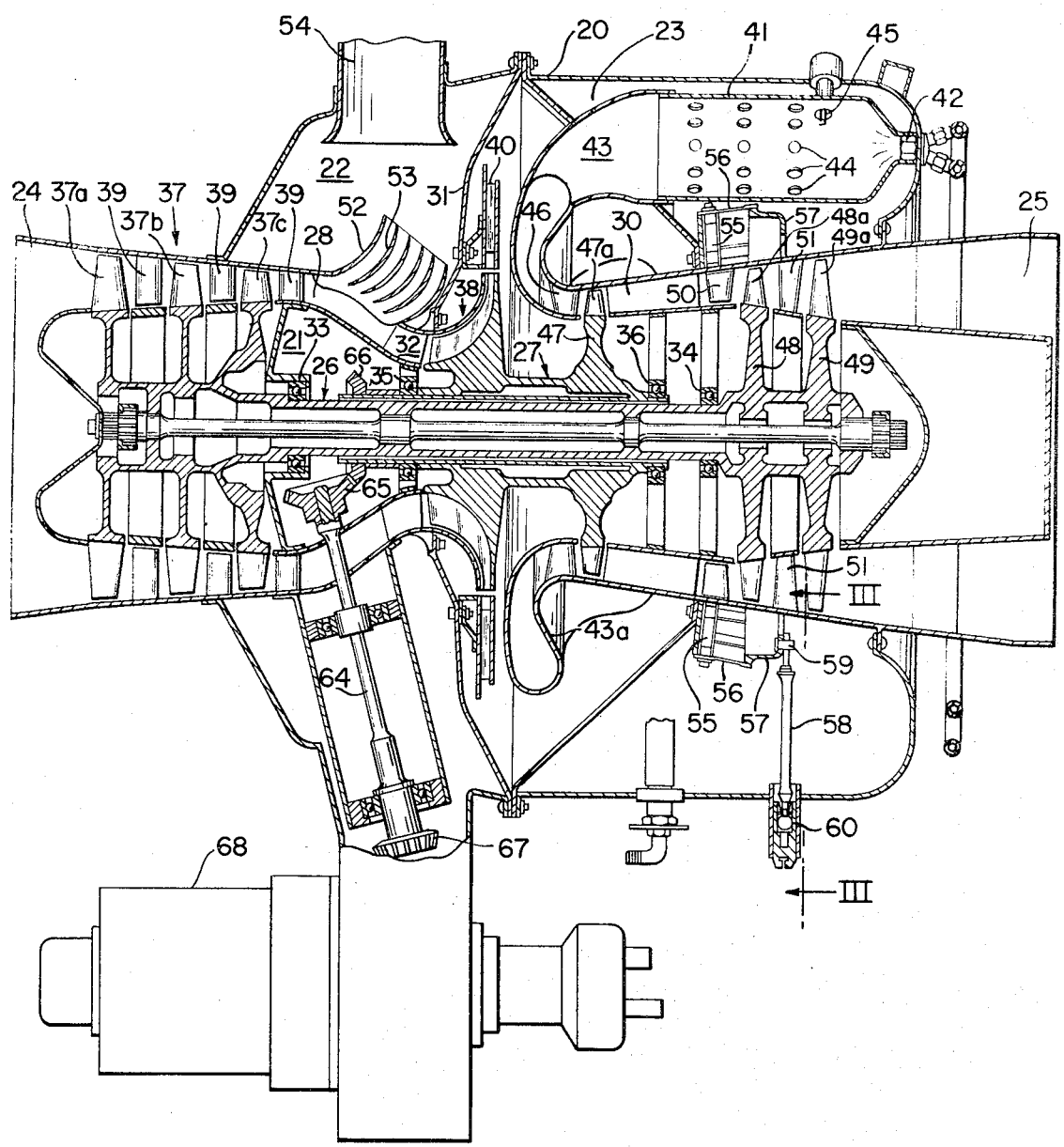
FIG. 1 is a axial sectional view taken through a gas turbine engine formed in accordance with the present invention.
Figure 2:
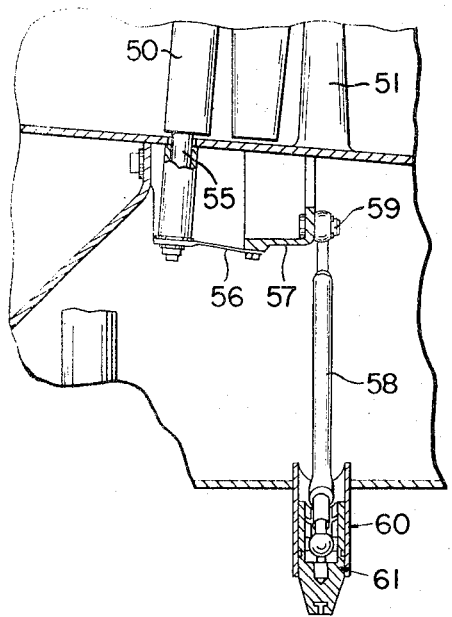
FIG. 2 is a sectional view on an enlarged scale of a variable area nozzle used in the engine shown in FIG. 1.
Figure 3:
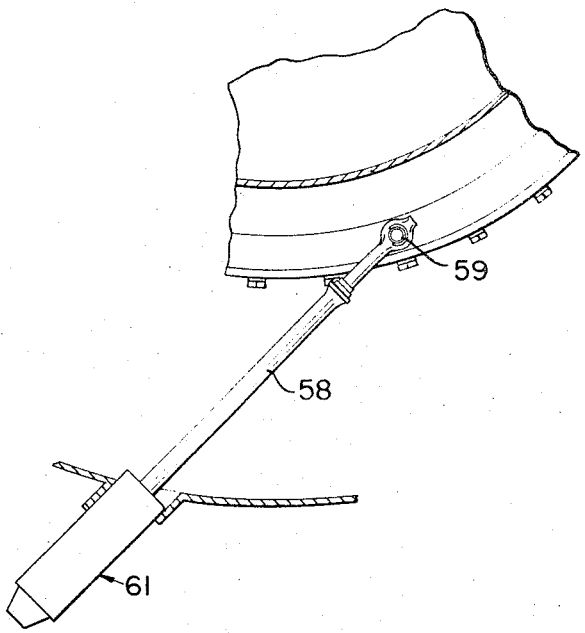
FIG. 3 is a transverse sectional view taken on the plane indicated by the line III—III of FIG. 1.

Referring more particularly to the drawings, and especially FIG. 1, the engine selected for illustration includes a casing 20 which will be composed of a number of suitable parts, some of which may be cast and others formed of sheet material. The casing 20 provides a rotor chamber 21, a bleed air chamber 22, and a combustion air chamber 23. Also provided by the casing is an air inlet 24 and an exhaust outlet 25.

The rotor chamber 21 receives rotor means including a pair of spool elements 26 and 27, the former being designated as the low-pressure spool and the latter as the high-pressure spool. The casing and portions of the spools cooperate to provide air and gas passages 28 and 30, respectively, which are of substantially annular cross section, the rotor means being disposed in the center of the rotor chamber with the air and gas passages disposed around the rotor chamber. The casing has a wall 31 which separates the bleed and combustion air chambers. This wall has a central opening 32 registering and communicating with the aforementioned air passage.

The spools are disposed in concentric relation with the shaft of the high-pressure spool 27 surrounding that of the low-pressure spool 26. These spools are supported for rotary movement in sets of bearings 33, 34, 35, and 36. Bearings 33 and 34 support the inner spool, while bearings 35 and 36 support the outer spool. The bearings are mounted in suitable portions of the casing which include struts extending across the annular air and gas passages. The spools each include compressor and turbine portions. The compressor portion 37 of the low-pressure spool has a plurality of axial stages 37a, 37b and 37c, while the compressor portion 38 of the high-pressure spool has a single-stage centrifugal element. The inlet for this centrifugal element 38 is disposed in registration with the air passage at the opening 32 in the wall 31.

The air passage 28 has a plurality of stator vanes 39 at the downstream sides of the axial blades 37a, 37b and 37c of the low-pressure compressor, air being drawn through the inlet 24 and forced through the passage 28 by the impeller vanes. Some of the air discharged from the low-pressure compressor flows through the passage 28 to the inlet of the centrifugal compressor 38. Air discharged from this impeller flows radially outwardly through a diffuser section 40 to the combustion air chamber 23.

This chamber receives a plurality of circumferentially spaced axially extending combustor elements 41 of the can type, each of which has a fuel nozzle means 42 at one end and an outlet 43 at the other end. The outlets 43 communicate with a transitional gas collector ring 43a. The sides of the cans are provided with air inlet openings 44 suitably arranged to admit air for mixture with fuel sprayed into the cans by the fuel nozzles 42. This air and fuel mixture is initially ignited by a spark plug or other means 45, after which the flame will be self-supporting. The transitional gas collector ring 43a turns through an angle of approximately 180° to direct the gases of combustion to nozzle means 46 at the inlet end of the gas passage 30.

The spool elements 26 and 27 have turbine wheels 47, 48 and 49 formed thereon, blades 47a, 48a and 49a, respectively, on these wheels extending into the gas passage. The high-pressure spool has a single turbine stage while the low-pressure spool has a plurality of stages.

It will be noted from FIG. 1 that the high-pressure impeller is straddle-mounted in its bearings, that is, the turbine and compressor portions are disposed between the bearings. The low-pressure spool, on the other hand, is overhung relative to its bearings, the compressor and turbine elements being arranged at the ends of the spool beyond the bearings therefor. This arrangement disposes the bearings for the spools in front and rear groups which are spaced longitudinally of the rotor chamber. The front group is disposed between the compressor sections of the spools and the rear group is disposed between the turbine for the high-pressure spool and the first turbine for the low-pressure spool. In this manner the introduction and withdrawal of lubricating fluid for the bearings will be facilitated.

From the foregoing, it will be apparent that rotation of the spools will draw air into the inlet of the air passage where it will be compressed and discharged into the combustion air chamber. The air will flow into the combustors 41 and mix with fuel sprayed from the nozzles 42, this mixture being burned to provide hot gases which flow to the nozzles 46 for application to the first turbine 47 in the gas passage. The gases impinging on the blades 47a of the first turbine cause the high-pressure spool to rotate and drive the centrifugal compressor 38. Gases leaving the first turbine flow through the gas passage to additional nozzle means 50 which direct them against the blades 48a of the turbine wheel 48, gases leaving this wheel being directed by additional nozzle vanes 51 against the blades 49a of the turbine wheel 49. Wheels 48 and 49 are part of the low-pressure spool, and gases striking the blades of these wheels impart rotary movement to the low-pressure spool which, as previously pointed out, includes the axial blades of compressor 37.

As heretofore set forth, it is an object of the invention to provide an engine to supply bleed air in addition to shaft power. Such bleed air is taken from the low-pressure compressor through separator outlets 52 which communicate with the air passage at the discharge side of the low-pressure compressor. The separator outlets constitute short, curved duct sections with a plurality of scooplike guide walls 53 to collect and direct part of the air discharged by the low-pressure spool into the bleed air chamber. The air flows from this chamber through a suitable outlet duct 54.

The inlet ends of the separator outlets are arranged in the air passage in a manner to collect clean air to be supplied to the bleed air chamber. Dust and other foreign matter will bypass the separator outlets and flow to the combustion air chamber to be burned with the fuel and air mixture. The bleed air outlet duct 54 leads to environmental control system or other means for utilizing variable quantities of compressed air. Since the requirements for compressed air vary, it is desirable to vary the speed of the low-pressure spool in accordance with such requirements. In the first form of the invention, this objective is secured by making the nozzle vanes 50, for the first turbine stage of the low-pressure spool, adjustable. These vanes have shafts 55 supported for rotation about radially extending axes, the outer ends of the shafts being provided with crank arms 56. These arms are pivotally connected at their free ends with a ring 57 suitably supported for limited rotary adjustment about the axis of the rotor chamber. This adjustment is accomplished through connecting rods 58 having pivotal connections, as at 59, with the ring 57. The connecting rods are arranged approximately tangent to the ring 57 and are universally connected at their outer ends with guided crossheads 60, suitable actuator members 61 being provided to impart movement to the crossheads. The actuators may be fluid-pressure-operated with movable wall elements 62 to impart movement in at least one direction to the connecting rods 58. In one form of the invention the wall means 62 of the actuators 61 are moved in the opposite direction by spring force, suitable stop means 63 being provided to limit the movement in this direction so that stator vanes 50 will be maintained in a predetermined position in the event of failure of the fluid supply.

The objects point out that the engine is intended to drive one or more accessories, such as a generator or hydraulic pump or both, at constant speeds. To satisfy this objective, power is taken from the high-pressure spool through a shaft 64 extending laterally through the engine casing. The inner end of this shaft has a bevel gear 65 secured thereto for meshing engagement with a complemental gear 66 on the shaft of the high-pressure spool. Suitable bearings, seals, etc., are provided for the shaft 64. The outer end of this shaft is also provided with bevel gearing 67 to mesh with complemental gearing arranged to drive the accessories 68.

Figure 4:
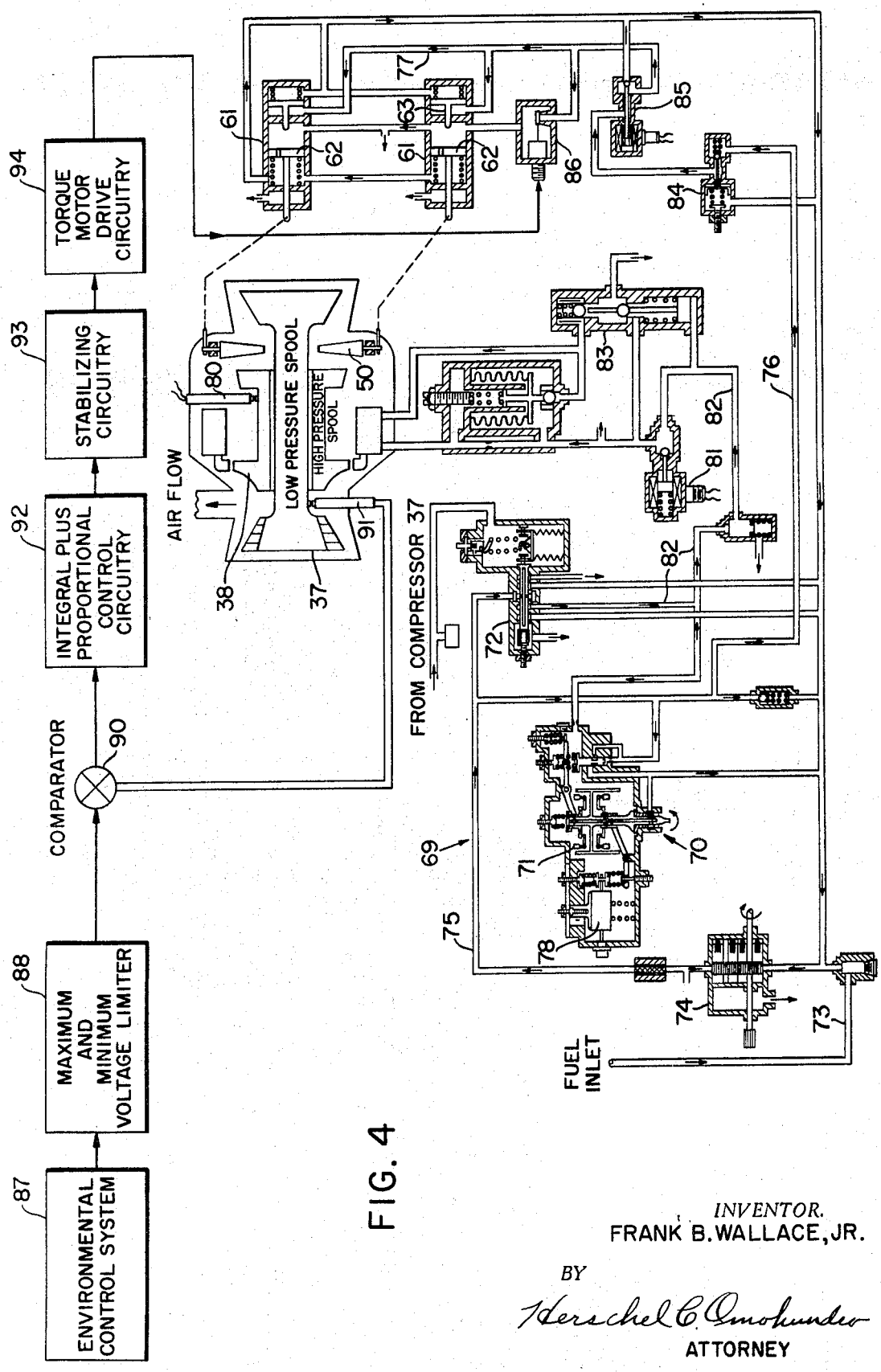
FIG. 4 is a schematic view of the control system for the engine of FIG. 1.

As is well known, some accessories, such as electrical generators and hydraulic pumps, are preferably driven at constant speed to deliver uniform outputs. The engine is therefore provided with a system for controlling fuel flow to the combustor, the system being responsive, in part, to the speed of operation of the high-pressure spool. The control system is shown schematically in FIG. 4. Reference to this figure will show that the control system, designated generally by the numeral 69, includes a combination of fuel and electrical portions. Since both spools of the engine are driven by the gases of combustion, the operations of both spools will affect the fuel requirements. As mentioned previously, the high-pressure spool must be operated at a substantially constant speed. The fuel supply portion of the control system is therefore made primarily responsive to the speed of the high-pressure spool. This feature is accomplished by employing a scheduling and governing valve 70, which has a scheduling fly-weight mechanism 71 driven by the high-pressure spool, and a metering valve 72 responsive, in part, to the pneumatic output of the low-pressure compressor. The control system 69 receives fuel from a suitable source via line 73 leading to engine driven pump 74 which discharges fuel under pressure through line 75. This line communicates with both scheduling valve 70 and metering valve 72. It also communicates via line 76 with a portion 77 of the control system employed as a hydraulic pressure system for actuating the variable nozzles to vary low-pressure spool speed.

The valve 70 is of the bypass type which is responsive through the flyweight mechanism 71 to bypass excess fuel back to the fuel reservoir when the high-pressure spool reaches a predetermined speed. If the spool should tend to slow down, the amount of fuel bypassed will decrease to restore spool speed. Changing fuel requirements are also compensated for by a torque motor 78 provided on the valve 70 and responsive to an electronic speed error signal generated by a monopole pickup 80 disposed adjacent the shaft portion of the high-speed spool to sense speed. A main fuel solenoid "On-Off" valve 81 is employed in line 82 which leads from valve 72 to the combustors. Valve means 83 may be provided for automatically draining to a suitable region the fuel remaining in the lines leading to the combustors upon interruption of engine operation.

The portion 77 of the control system includes a pressure regulator 84, a solenoid "On-Off" valve 85, and a torque motor control valve 86. Line 76 conducts fuel under pressure from pump 74 to pressure regulator 84. When valve 85 is energized, fluid under predetermined pressure will be supplied to portion 77 of the control system for the operation of the variable nozzle mechanism of the low-speed spool. Such operation, in one mode of use of the engine, is responsive to a demand for pneumatic power from means such as the environmental control system, represented in FIG 4 by the block 87, of an aircraft. When the system 87 requires air, a demand signal in the form of a positive voltage (0 to 10 Volts) is transmitted through a maximum and minimum voltage limiter 88 to an electronic comparator or adder 90. A negative voltage signal proportional to actual low-pressure spool speed measured with a monopole pickup 91 disposed adjacent the shaft of the low-pressure spool is also supplied to adder 90. The speed error resulting is transmitted from adder 90 to integral plus proportional control circuitry 92 to direct a control signal through stabilizing and drive circuitry 93 and 94 to the torque motor 86. This motor is of the proportional type and functions to provide flow, in proportion to the signal supplied, from the pressure regulator 84 to the actuators 61. If the signal calls for additional pneumatic power, the actuators will close nozzles 50 to increase the gas pressure drop in the low-pressure spool turbines. Should the signal call for a reduction in pneumatic power, the torque motor 86 will reduce the application of hydraulic pressure to the actuators 61 and spring means therein will adjust the nozzles 50 toward open positions. When valve 85 is deenergized, portion 77 of the fluid pressure system is connected with a drain or reservoir and stops 63 will be resiliently returned to a point to locate walls 62 in a predetermined minimum low-pressure output nozzle position.

From the preceding description of the mechanism and its operation, it will be apparent that a twin-spool engine and control system has been provided which will function to drive accessories at a constant rate and supply pneumatic power at a variable rate as required by means using such power. The control system has means responsive to the speed of operation of a high-pressure spool of the engine to make such spool operate at constant speed and other means responsive to the demands of a pneumatic power using system to vary the rate of operation of a low-pressure spool in accordance with such demands.

Figure 5:
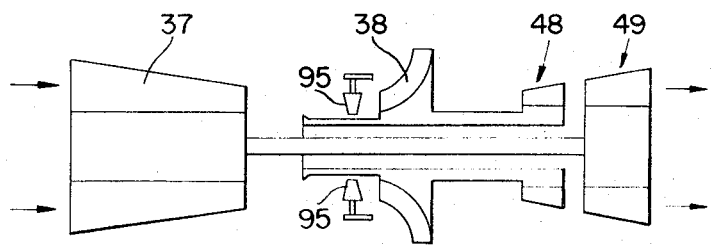
FIG. 5 is a fragmentary axial sectional view of a portion of a slightly modified form of engine designed to function in a manner similar to the engine of FIG. 1.

While it is preferable to vary the speed of the low-pressure spool through the use of adjustable nozzles for the turbine of such spool, it is possible, as shown in FIG. 5, to secure the same results by providing variable vanes 95 at the inlet of the high-pressure compressor. The control system will then be connected to cause these vanes to vary the flow of air from the low- to the high-pressure compressor in a manner to adjust the speed of operation of the low-pressure spool. Since such speed is proportional to the requirements of the pneumatic power utilizing mechanism, only that fuel which is necessary to produce such power over and above that required for the constant speed spool will be employed, and a maximum economy will result.

I claim:
1. A gas turbine engine comprising:
   a. casing means forming a rotor chamber, a bleed air chamber, and a combustion air chamber;
   b. rotor means in said rotor chamber having dual independently rotatable spools, each spool having a compressor impeller and turbine means for driving the same;
   c. means in said casing for separating the output of the compressor impeller of one spool into two parts and directing one part to the bleed air chamber and the balance to the inlet of the compressor of the other spool, the latter discharging into said combustion air chamber;
   d. combustor means in said combustion air chamber for mixing and burning fuel with air supplied thereto to produce hot gases;
   e. nozzle means for directing the hot gases to the turbine means on said spools to impart rotary motion thereto;
   f. power shaft extraction means having a shaft in driving engagement with said other spool; and
   g. means for varying the speed of rotation of said one spool to change the rate of flow of bleed air into said chamber while maintaining the speed of rotation of said other spool substantially constant, and thereby maintaining the speed of rotation of said shaft substantially constant.

2. The gas turbine engine of claim 1 in which said nozzle means includes adjustable vane means and said means for varying the speed of rotation of said one spool includes means for adjusting the position of said vane means to change selectively the power imparted to the turbine blades of said one spool.

3. The gas turbine engine of claim 1 in which the compressor impeller of said one spool is of the axial type and the compressor impeller of said other spool is of the centrifugal type.

4. The gas turbine of claim 3 in which the axial-type compressor impeller is upstream of the centrifugal-type compressor impeller.

5. The gas turbine engine of claim 1 in which said means for varying includes control means for said engine, said control means having portions responsive to signals from independent sources to cause said other spool to operate at substantially constant speed and said one spool to operate at variable speeds required to supply predetermined volumes of air to said bleed air chamber.

6. The gas turbine engine of claim 3 in which said means for varying includes control means for varying the rate of operation of the spool having the axial compressor and maintaining constant the rate of operation of the other spool.

7. The gas turbine engine of claim 6 in which a control system is provided having means responsive to the demands of pneumatic power utilizing means to actuate the means for varying the rate of operation of the spool having the axial compressor.

8. The gas turbine engine of claim 7 in which the control system is provided with means responsive in part to the rate of operation of said other spool to govern the supply of fuel to the engine.

9. The gas turbine engine of claim 2 in which fluid pressure responsive means are provided to actuate said adjustable vane means and means are also provided for controlling the application of fluid pressure to said fluid pressure responsive means in accordance with demands for pneumatic power by means utilizing the same.

10. The gas turbine engine of claim 6 in which said control means has a fuel control means operative to govern the total power developed to operate said turbine means, and means for regulating the division of power between the turbine means for said spools to maintain constant the rate of operation of one spool and vary the rate of operation of the spool which drives the axial compressor in accordance with the demands of means utilizing the air directed to the bleed air chamber.

11. The gas turbine engine of claim 5 in which said control means has adjustable means for varying the admission of air to one of said compressor impellers.

12. In an environmental control system, the combination comprising:
 a. an auxiliary power unit having means for separately delivering shaft power and pneumatic power, said power unit including a gas turbine engine having a plurality of spools, a first one of said spools being operated at a constant speed to provide said shaft power and a second one of said spools being operated at a variable speed to provide said pneumatic power at variable pressure and quantities; and
 b. control means for said power unit operable, in response to changing requirements of a region utilizing said pneumatic power, to adjust the operation of said second spool to vary the pressure and quantity of pneumatic power delivered while maintaining the speed of said first spool substantially constant.

13. A gas turbine engine comprising:
 a first means forming a casing having an air inlet at one end, an exhaust gas outlet at the other end, said first means also forming an annular passage extending from the air inlet to the gas outlet;
 first and second spool assemblies supported for rotation in said casing in concentrically arranged relation, the first spool assembly having a plurality of axial compressor blades projecting into said annular passage and a first set of turbine blades extending into said annular passage, the second spool assembly having a centrifugal compressor rotor with the inlet thereof communicating with the annular passage downstream from said axial compressor blades and a second set of turbine blades projecting into said annular pasage in advance of the turbine blades of said first spool assembly;
 a bleed air discharge passage communicating with said annular passage between said axial compressor blades and said centrifugal compressor rotor inlet;
 burner means communicating with said annular passage for increasing the temperature and pressure of gases in said annular passage between said centrifugal compressor and said second set of turbine blades;
 shaft power extraction means having a rotary shaft and including means coupling said rotary shaft to said second spool assembly for rotation therewith; and
 adjusting means in said annular passage upstream from said first set of turbine blades for varying the torque applied to said first spool assembly by said turbine blades by gases flowing in said annular passage, said adjusting means operating to change the rate of flow of said bleed air through said discharge passage without changing the speed of rotation of said second spool and thereby maintaining the speed of said shaft substantially constant.

14. A gas turbine engine according to claim 13 wherein said adjusting means includes vanes positioned in said annular passage adjacent said first set of turbine blades, and includes means for selectively changing the position of said vanes to change the power imparted to said first spool assembly by gases flowing in said annular passage.

15. The gas turbine engine according to claim 13 including control means responsive to demand for bleed air for operating said adjusting means to increase the speed of said first spool assembly when a higher rate of flow of bleed air is required and to decrease the speed of rotation of said first spool assembly when less bleed air is required, said control means maintaining the speed of rotation of said second spool assembly substantially constant.

* * * * *